(12) United States Patent
Fuchs

(10) Patent No.: US 7,306,116 B2
(45) Date of Patent: Dec. 11, 2007

(54) DOSING DEVICE

(75) Inventor: Karl-Heinz Fuchs, Radolfzell (DE)

(73) Assignee: Ing. Erich Pfeiffer GmbH, Radolfzell (DE)

( * ) Notice: Subject to any disclaimer, the term of this patent is extended or adjusted under 35 U.S.C. 154(b) by 832 days.

(21) Appl. No.: 10/303,482

(22) Filed: Nov. 25, 2002

(65) Prior Publication Data

US 2003/0100867 A1 May 29, 2003

(30) Foreign Application Priority Data

Nov. 29, 2001 (DE) ................................ 101 59 692

(51) Int. Cl.
*B67D 5/22* (2006.01)

(52) U.S. Cl. .................... 222/38; 222/36; 222/153.01; 222/321.7

(58) Field of Classification Search .................. 222/25, 222/36, 38, 41, 153.01, 45, 153.13, 321.7, 222/321.9, 383.1, 385, 46, 153.04
See application file for complete search history.

(56) References Cited

U.S. PATENT DOCUMENTS

| | | | |
|---|---|---|---|
| 4,162,746 A * | 7/1979 | Anderson et al. ...... | 222/153.13 |
| 4,220,247 A * | 9/1980 | Kramer ...................... | 215/219 |
| 4,565,302 A | 1/1986 | Pfeiffer et al. | |
| 4,773,567 A * | 9/1988 | Stoody ................... | 222/153.11 |
| 4,871,092 A * | 10/1989 | Maerte .................. | 222/153.13 |
| 4,934,568 A | 6/1990 | Fuchs | |
| 5,277,334 A | 1/1994 | Malinconico | |
| 5,335,823 A | 8/1994 | Fuchs et al. | |
| 5,469,989 A | 11/1995 | Graf et al. | |
| 5,584,417 A | 12/1996 | Graf et al. | |
| 6,062,433 A * | 5/2000 | Fuchs .................... | 222/153.13 |
| 6,164,494 A * | 12/2000 | Marelli ........................ | 222/38 |

FOREIGN PATENT DOCUMENTS

| | | |
|---|---|---|
| DE | 40 27 672 | 3/1992 |
| DE | 298 14 647 | 1/2000 |
| EP | 0 098 939 | 1/1984 |
| GB | 2 348 928 | 10/2000 |

* cited by examiner

*Primary Examiner*—Frederick C. Nicolas
(74) *Attorney, Agent, or Firm*—Flynn, Thiel, Boutell & Tanis, P.C.

(57) ABSTRACT

A dosing device includes a body and an actuating element mounted in non-rotatable, liftable manner on the body. A counting device for the actuating strokes has a rotary counting ring forcibly coupled as a function of a lifting movement of the actuating element. A lock blocks the actuating element following a predetermined number of actuating strokes.

The lock is associated with the counting ring in such a way that the latter can perform more than a complete revolution before the actuating element is blocked.

8 Claims, 3 Drawing Sheets

DOSING DEVICE

FIELD OF THE INVENTION

The invention relates to a dosing device having a body, as well as an actuating element mounted in non-rotatable, liftable manner on the body, as well as with a counting device for the actuating strokes, which has a rotary counting ring forcibly coupled as a function of a lifting movement of the actuating element, and with at least one locking means for blocking the actuating element following a predetermined number of actuating strokes.

Such a dosing device can be used for different media, particularly in gaseous or flowable form. Besides liquid media, the term flowable form also covers viscous, gel-like and pulverulent media.

BACKGROUND OF THE INVENTION

DE 33 02 160 A1 discloses a dosing device, which is designed as a manually actuatable, single-acting piston pump. During the actuating stroke a specific substance quantity is discharged, more particularly in atomized form. Such a dosing device is more particularly used for dosing pharmaceuticals for medical purposes. To ensure that for the medical administration period no underdosing or overdosing occurs or the substance is not taken for too long or too short a period, the dosing device is provided with a counting device. The counting device has a counting ring, which is mounted in rotary manner coaxially round a body. The dosing device is manually started up by an actuating element by means of a stepping mechanism, which is mounted in liftable and non-rotary manner relative to the body. The counting ring is forcibly coupled with the actuating element in such a way that during a lifting movement of the actuating element, for every actuating stroke the counting ring advances circumferentially by in each case one counting position. With the counting ring is associated a stop, which limits the rotary movement in the circumferential direction of the counting ring to a rotation angle smaller than 360ø. As soon as the counting ring has reached the stop, a further actuation of the actuating element is impossible. The number of actuating strokes is consequently limited by the number of counting steps of the counting ring and by the choice of counting ring can be matched to the medium to be dosed, particularly a medical application by means of a pharmaceutical.

The problem of the invention is to provide a dosing device of the aforementioned type, which allows an improved dosing.

SUMMARY OF THE INVENTION

This problem is solved in that at least one locking means is associated with the counting ring in such a way that the counting ring can perform more than a complete revolution before the actuating element is locked. Due to the fact that the counting ring can be rotated or turned by more than a complete revolution, it is possible to perform a larger number of actuating strokes, which enables a better dosing to be obtained.

According to a development of the invention with the counting ring are associated guide means, which are superimposed on the counting ring in the lift direction or alternatively guide a rotary movement. It is possible for the counting ring to be continuously guided with a helical or spiral movement (FIG. 5), so that movements in the rotation direction and lift direction are superimposed on one another. The counting ring can also be guided in stepped manner, in that a short lift movement to the in each case next step level can be interposed with rotary movement portions over in each case a specific circumferential angle (FIGS. 4, 6). The expression superimposing a lift movement on the rotary movement is understood to mean a movement of the counting ring with a specific or several predetermined pitches or leads, the particular pitch or lead being constituted by the travel in the circumferential direction on the one hand and the lift component in the axial direction on the other.

According to a further development of the invention the counting ring is mounted so as to rotate helically relative to a median longitudinal axis of the body. The helical movement permits a rotatability of the counting ring over and beyond a complete revolution, so that the number of counting steps can be correspondingly increased. It is in particular possible to almost double the number of counting steps compared with the prior art.

According to a further development of the invention the counting ring is held by means of a screw thread on the body or on the actuating element and its pitch is matched to indexing means for the counting ring. The counting ring consequently forms a threaded nut, which is preferably provided with an internal thread. The pitch of the screw thread is chosen in such a way that it does not offer an excessive resistance to a lift movement of the actuating element so as not to impair the manual operability. Preferably the pitch of the screw thread is not self-locking.

BRIEF DESCRIPTION OF THE DRAWINGS

Further advantages and features of the invention can be gathered from the claims and the following description of a preferred embodiment of the invention and the attached drawings, wherein show:

DETAILED DESCRIPTION OF THE INVENTION

Figure 1:
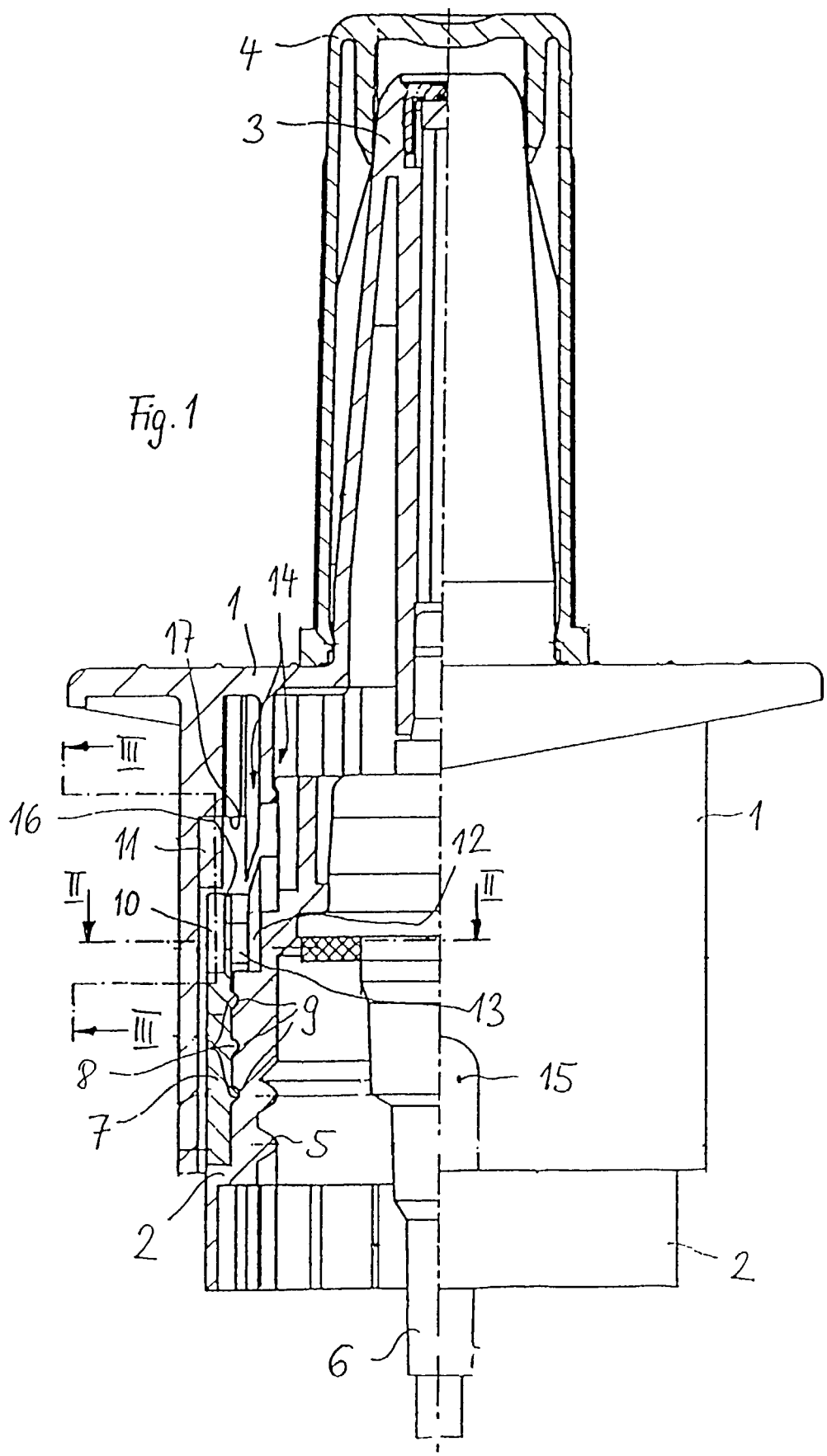
FIG. 1 In part sectional form an embodiment of a dosing device according to the invention.
Figure 2:
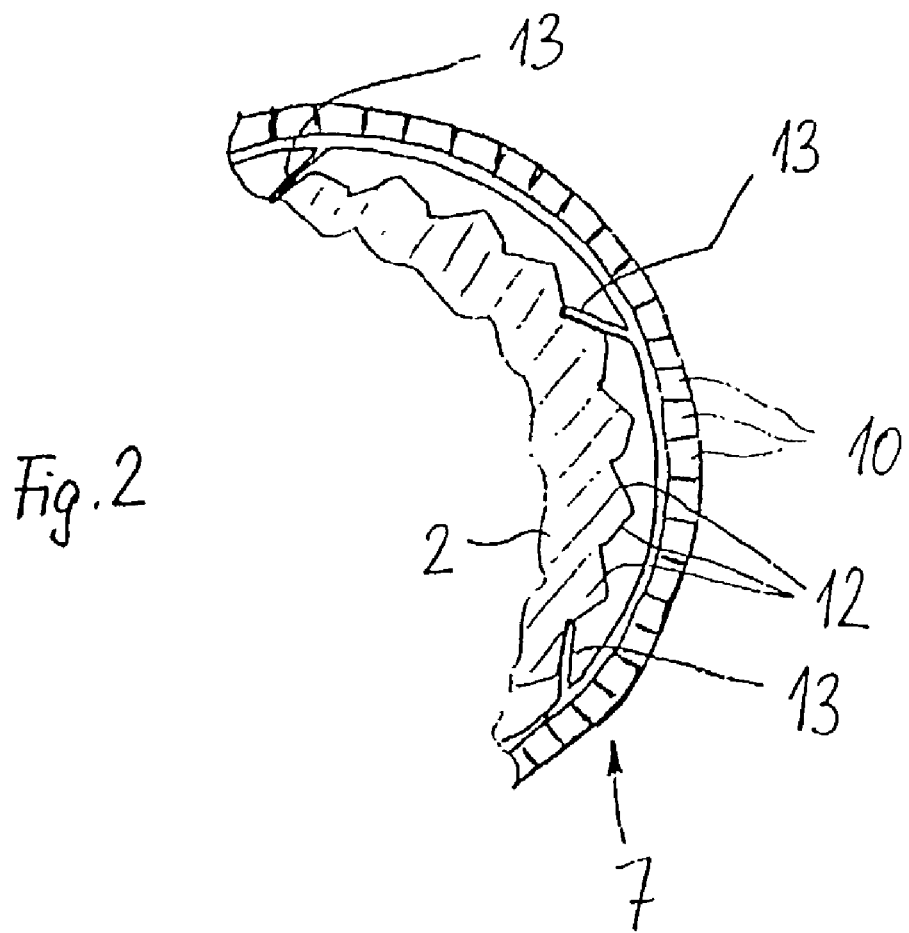
FIG. 2 Diagrammatically a detail of the dosing device of FIG. 1 along the section line II-II thereof.
Figure 3:
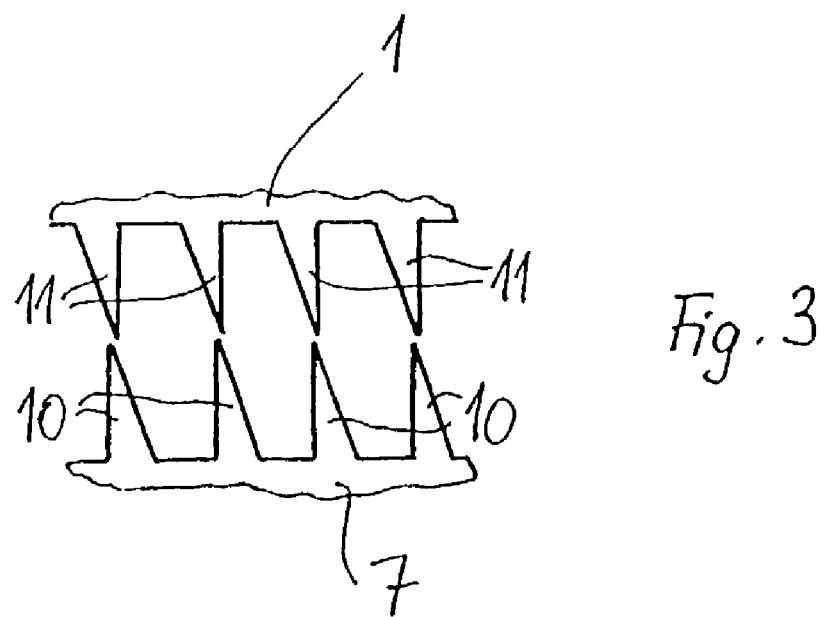
FIG. 3 Diagrammatically a sectional representation of a detail III-III in FIG. 1.
Figure 4:
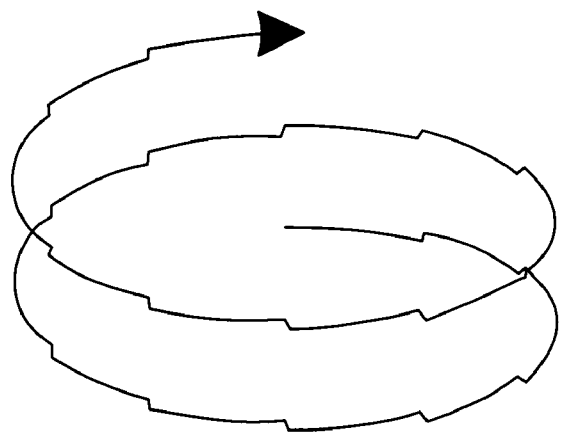
FIG. 4 Schematically a representation of a stepped manner of movement of a counting ring of the dosing device of FIGS. 1-3.
Figure 5:
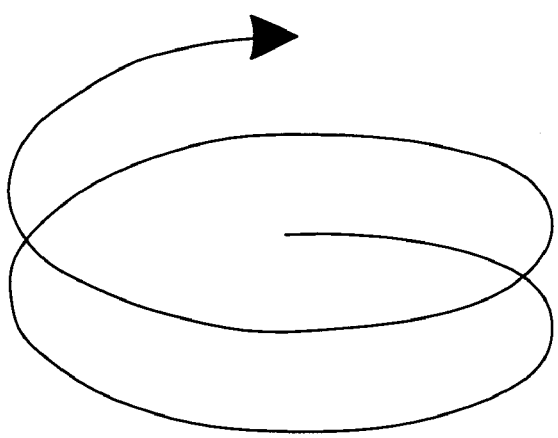
FIG. 5 Schematically a representation of helical movement of the counting ring of FIGS. 1-3.
Figure 6:
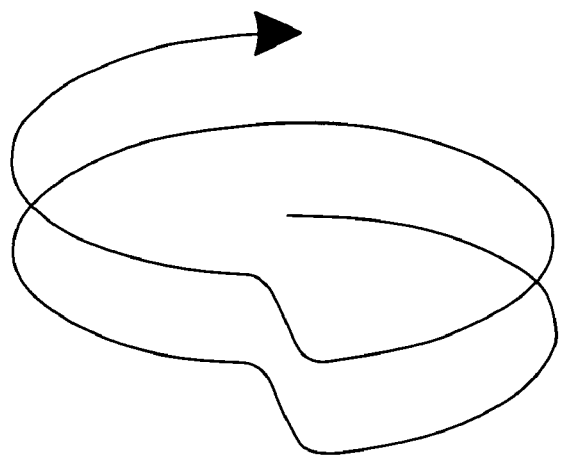
FIG. 6 Schematically a representation of a stepped manner of movement of the counting ring of FIGS. 1-3.

The dosing device according to FIGS. 1 to 3 allows an atomization and dosed discharge of a pharmaceutical medium. In the same way the dosing device according to FIGS. 1 to 3 can also be used for other media of different types. The dosing device has a body 2, which in the embodiment shown is in the form of a screw cap which can be screwed onto a container such as in particular a bottle. To this end the screw cap has an internal thread 5 onto which can be screwed a corresponding bottle neck or a neck of a similar container. In the screwed on state the body 2 is positioned in stationary manner. An actuating element 1, in the present case in the form of a nose spray attachment, is mounted on the body 2 so as to be liftable and non-rotatable relative to said body 2. The liftability of the actuating element 1 takes place coaxially to the median longitudinal axis of the body 2, represented in dot-dash line form, but which does not carry reference numerals. The actuating element 1 has an upwardly projecting extension, which has at its upper end an atomizing nozzle 3. The extension is locked by a locking cap 4. In its lower region the actuating element 1 has a jacket, which surrounds the body 2 over part of its height. In the vicinity of its top the jacket is provided with horizontal bearing surfaces, which pass into the nose spray extension. The bearing surfaces serve as a working surface for the fingers of the operator's hand, so as to permit the exerting of a corresponding pumping movement on the actuating element 1 and therefore on the entire dosing device, in this case constructed as a piston pump.

The actuating element 1 is guided in non-rotary, liftable manner with the aid of axial guide ribs and grooves 14, i.e. which are parallel to the median longitudinal axis of the body 2. In addition, the guide ribs and grooves are positively axially interconnected by means of corresponding, not further designated ring shoulder portions in an upper end position of the actuating element 1, which leads to an upper axial limitation for the actuating element 1. Thus, due to the spring tension of a per se known pumping means, in the unloaded state the actuating element 1 is kept pressed against the thus formed stop.

The actuating element 1 acts on the pumping means 6 constructed as a piston pump and whose suction line projects into the not shown storage container.

Between the body 2 and the jacket of the actuating element 1 is provided a counting ring 7, which is guided in helically movable manner by means of an internal thread 8 on a corresponding external thread 9 on the outer circumference of the body 2. In its upper marginal area the counting ring 7 is externally provided with an axial tooth system 10 (FIGS. 2 and 3). Corresponding teeth of the axial tooth system 10 project axially upwards and in each case are circumferentially provided on the same side with a sloping tooth surface. Corresponding thereto on the inside are provided on the jacket of the actuating element 1 a corresponding number of teeth of a further axial tooth system 11, which is shaped in one piece on the actuating element 1. The teeth of the axial tooth system 11 are downwardly directed in opposition to the axial tooth system 10. Each tooth has a corresponding sloping tooth surface. The axial tooth systems 10 and 11 are axially superimposed in such a way that during a lifting movement of the actuating element 1 in the downwards direction the teeth of the upper axial tooth system 11 with the sloping tooth surfaces meet the corresponding sloping tooth surfaces of the lower tooth system 10 and in this way exert a circumferential force on the counting ring 7. As a result of the forced guidance of the counting ring 7 along the helical or spiral path, the counting ring 7 is firstly turned circumferentially by a specific amount and secondly is moved upwards or downwards along the pitch of the guide means 8, 9 in thread form. The spring webs 13 and support tooth system 12 in conjunction with the axial tooth systems 10, 11 form indexing means for the counting ring moving the latter stepwise in the counting direction. Thus, a stepping mechanism for moving the counting ring 7 is formed. According to a preferred embodiment, in the case of an internal diameter of the counting ring 7 of 23 mm, there is a pitch for the guide thread of 2 mm.

In the upper marginal area of the counting ring 7 on the inside of the cylindrical sleeve portion and therefore level with the axial tooth system 10 is provided a clearly defined number of spring webs 13, which according to FIG. 2 are oriented in inclined manner and cooperate with a corresponding support tooth system 12 on the outer jacket of the body 2. The spring webs 13 in conjunction with the support tooth system 12 ensure that the counting ring 7 can only be rotated in a single rotation direction. In the opposite rotation direction, the spring webs 13 and support tooth system 12 block a corresponding rotary movement of the counting ring 7. The spring webs 13, support tooth system 12 and axial tooth systems 10, 11 are matched to one another in such a way that during a lifting movement of the actuating element 1 the counting ring 7 is in each case advanced by a single counting step and can no longer be rotated back to its original position. The spring webs 13 block rotary movements of the counting ring 7 counter to the defined counting direction.

On its outer circumference the counting ring has a number sequence corresponding to the numbering of the successive counting steps. In the present embodiment the number sequence is applied helically along the outer circumference of the counting ring 7 corresponding to the pitch of the guide thread and in particular running in the same or opposite direction. The jacket of the actuating element 1 has a viewing opening 15 designed in such a way that it is in each case possible to see a number, namely that of the associated counting step.

In a not shown embodiment of the invention, the number sequence does not rise uniformly and is instead applied in stepped manner along the outer circumference of the counting ring.

In another not shown embodiment of the invention, the viewing opening is a variable viewing window, which is forcibly jointly moved by the forced guidance means as a function of the rotary movement of the counting ring so as to be able to determine the present number of the number sequence.

In another embodiment according to the invention there are at least two viewing openings at different levels and/or on different circumferential areas of the counting ring, which alternatively render visible the corresponding numbers of the uniformly or non-uniformly rising or falling number sequence.

In conjunction with the corresponding support surfaces 17 of the actuating element 1, an upper face 16 of the counting ring 7 serves as a locking means which, after a given number of counting steps, blocks a further actuation of the dosing device. Starting from the first lift movement, with the number of lift actuations the counting ring 7 migrates upwards in the manner of a worm gradually towards the body 2 and the viewing opening 15 shows which counting step has been reached. Following a predetermined number of counting steps the counting ring 7 has been screwed upwards to such an extent that the actuating element 1 can no longer or virtually no longer be pressed downwards, because the support surface 17 and face 16 meet one another. This represents the end of the dosing processes and the number of counting rings and therefore the number of lift actuations are in each case exactly matched to the desired dosing and administration period for the medium to be discharged.

The invention claimed is:

1. Dosing device having a body, an actuating element mounted in non-rotatable, liftable manner on the body, with a counting device for actuating strokes, which has a rotary counting ring forcibly coupled as a function of a lifting movement of the actuating element in a lift direction and mounted so as to be helically rotatable relative to a median longitudinal axis of the body, and at least one locking means for blocking the actuating element following a predetermined number of actuating strokes, wherein the at least one locking means is associated with the counting ring in such a way that the counting ring can rotate more than a complete revolution before the actuating element is blocked, and wherein guide means are associated with the counting ring, which guide the counting ring in a lift direction either superimposed to a rotary movement or alternative to a rotary movement, relative to said body.

2. Dosing device according to claim 1, wherein the counting ring is held by a screw thread on the body or on the actuating element, the screw thread having a pitch matched to indexing means for the counting ring.

3. A dosing device, comprising:
a body;
an actuating element mounted in non-rotatable, liftable manner on the body;
a device for counting actuating strokes, having a rotary counting ring mounted on the body and forcibly indexed as a function of a lifting movement of the actuating element in a lift direction, wherein the counting ring is mounted so as to be helically rotatable relative to a median longitudinal axis of the body; and
guide means associated with the counting ring, which guide the counting ring in a lift direction and in a rotary direction relative to said body.

4. Dosing device according to claim 3, further comprising at least one locking means for blocking the actuating element following a predetermined number of actuating strokes, wherein the at least one locking means is associated with the counting ring in such a way that the counting ring can rotate more than a complete revolution before the actuating element is blocked.

5. Dosing device according to claim 3, wherein the actuating element further comprises a jacket having a viewing opening, and a number sequence is applied helically on an outer circumference of the counting ring to appear through the viewing window.

6. Dosing device according to claim 3, wherein the counting ring is held by a screw thread on the body or on the actuating element, the screw thread having a pitch matched to indexing means for the counting ring.

7. Dosing device according to claim 3, wherein the guide means guide the counting ring sequentially in the lift direction and in the rotary direction.

8. Dosing device according to claim 3, wherein the guide means guide the counting ring in the lift direction superimposed on the rotary direction.

* * * * *